(12) United States Patent
Müller

(10) Patent No.: US 7,261,120 B2
(45) Date of Patent: Aug. 28, 2007

(54) DEVICE FOR SPLITTING A TWO-PHASE STREAM INTO TWO OR MORE STREAMS WITH THE DESIRED VAPOR/LIQUID RATIOS

(75) Inventor: Morten Müller, Fredensborg (DK)

(73) Assignee: Morten Muller Ltd. ApS, Fredensborg (DK)

( * ) Notice: Subject to any disclaimer, the term of this patent is extended or adjusted under 35 U.S.C. 154(b) by 319 days.

(21) Appl. No.: 10/874,141

(22) Filed: Jun. 22, 2004

(65) Prior Publication Data

US 2005/0000572 A1 Jan. 6, 2005

Related U.S. Application Data

(60) Provisional application No. 60/482,090, filed on Jun. 24, 2003.

(51) Int. Cl.
*F22B 37/26* (2006.01)
(52) U.S. Cl. .................. 137/154; 137/561 A; 137/590
(58) Field of Classification Search ................ 137/154, 137/561 R, 561 A, 590
See application file for complete search history.

(56) References Cited

U.S. PATENT DOCUMENTS

| | | | |
|---|---|---|---|
| 4,293,025 A | 10/1981 | Ohlswager et al. | |
| 4,396,063 A | 8/1983 | Godbey | |
| 4,512,368 A | 4/1985 | Kaminaka et al. | |
| 4,516,986 A | 5/1985 | Jepsen | |
| 4,528,919 A | 7/1985 | Harbolt et al. | |
| 4,574,827 A | 3/1986 | Konak | |
| 4,574,837 A | 3/1986 | Aggour et al. | |
| 4,662,391 A | 5/1987 | Tolley | |
| 4,681,129 A * | 7/1987 | Juzi et al. .................... | 137/154 |
| 4,800,921 A | 1/1989 | Greebe | |
| 4,824,614 A | 4/1989 | Jones | |

(Continued)

FOREIGN PATENT DOCUMENTS

EP 0003202 B1 1/1979

(Continued)

OTHER PUBLICATIONS

"How to Size Process Piping for Two-Phase Flow", Hydrocarbon Processing, Oct. 1969, pp. 105-116.

*Primary Examiner*—John Rivell
(74) *Attorney, Agent, or Firm*—Klein, O'Neill & Singh, LLP; Howard J. Klein

(57) ABSTRACT

A stream splitting device splits a two-phase inlet stream into two or more outlet streams having nearly identical vapor-to-liquid ratios. The inlet stream is directed into a separator vessel containing an impingement plate to decrease the velocity of the stream and direct it toward the inner walls of the vessel, where it impinges, separating the liquid from the vapor. Inside the vessel, each of two vertical suction channels with side wall apertures is in fluid communication with an outlet pipe. The lower ends of the suction channels are submerged in the liquid phase. Vapor flows though the apertures that are above the liquid surface in the vessel, thereby generating a pressure drop across the walls of the suction channels. Consequently, liquid is lifted up into the suction channels, where it is mixed with the vapor. The two-phase mixture then leaves the vessel and stream splitter through the outlet pipes.

56 Claims, 6 Drawing Sheets

U.S. PATENT DOCUMENTS

| | | |
|---|---|---|
| 5,059,226 A | 10/1991 | Schneider et al. |
| 5,190,105 A | 3/1993 | D'Souza |
| 5,250,104 A | 10/1993 | Berger et al. |
| 5,375,618 A * | 12/1994 | Giannesini ............ 137/590 |
| 5,437,299 A | 8/1995 | Kolpak |
| 5,810,032 A | 9/1998 | Hong et al. |
| 6,371,158 B1 * | 4/2002 | Hou et al. ............ 137/561 A |

FOREIGN PATENT DOCUMENTS

| | | |
|---|---|---|
| JP | 62059397 A2 | 9/1985 |
| JP | 02197768 A2 | 1/1989 |
| JP | 03113251 A2 | 9/1989 |

* cited by examiner

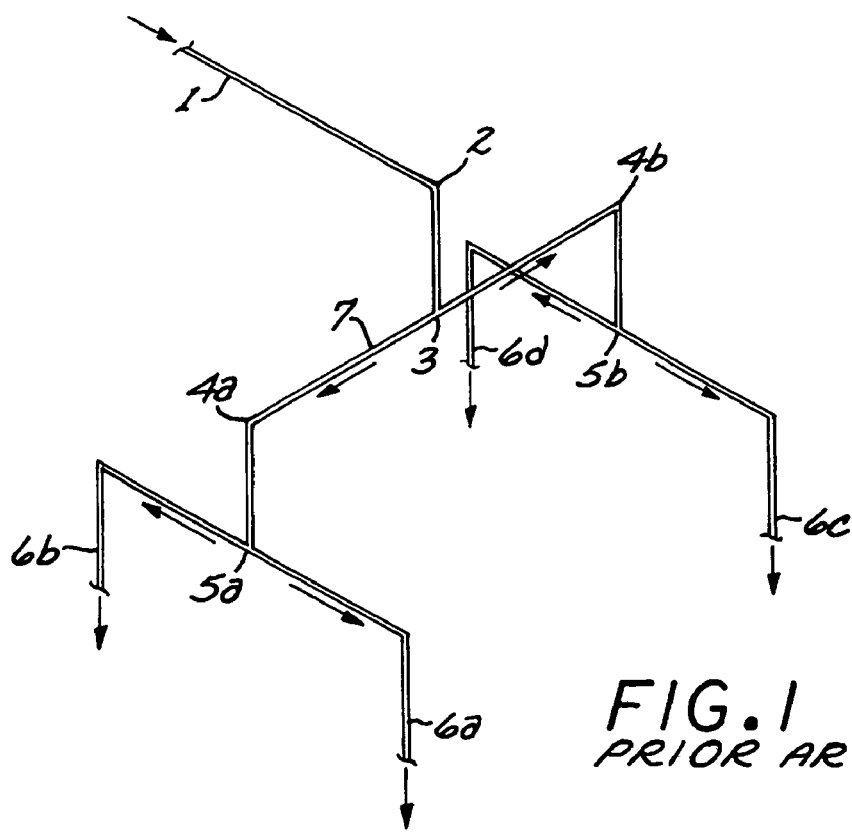
FIG. 1
PRIOR ART
FIG. 2
PRIOR ART
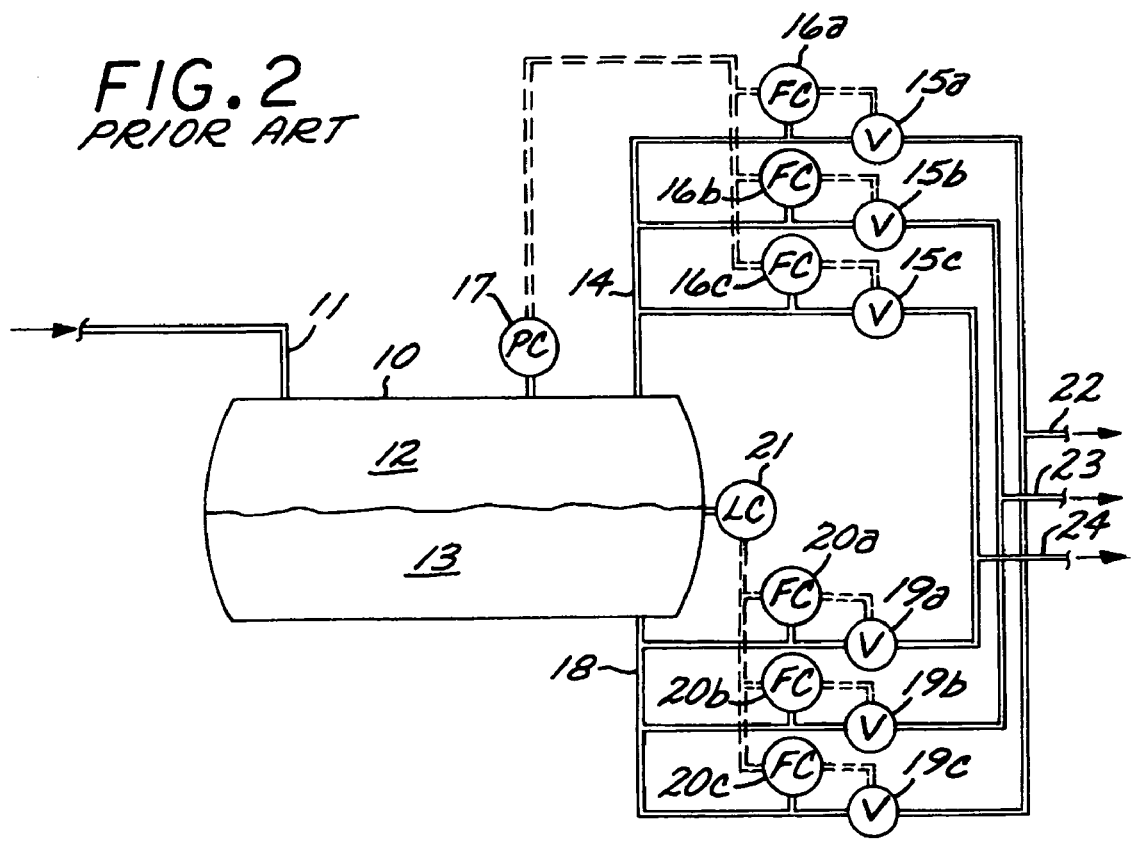

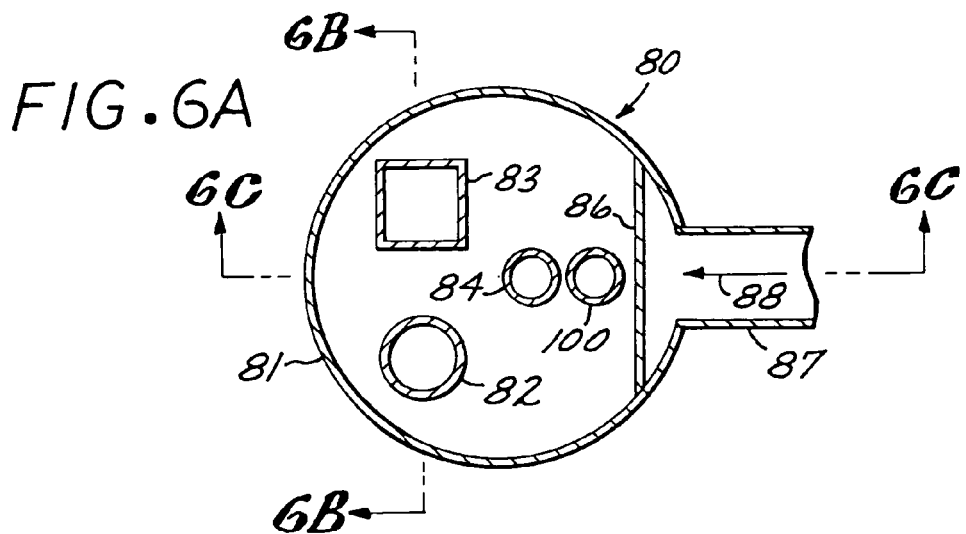
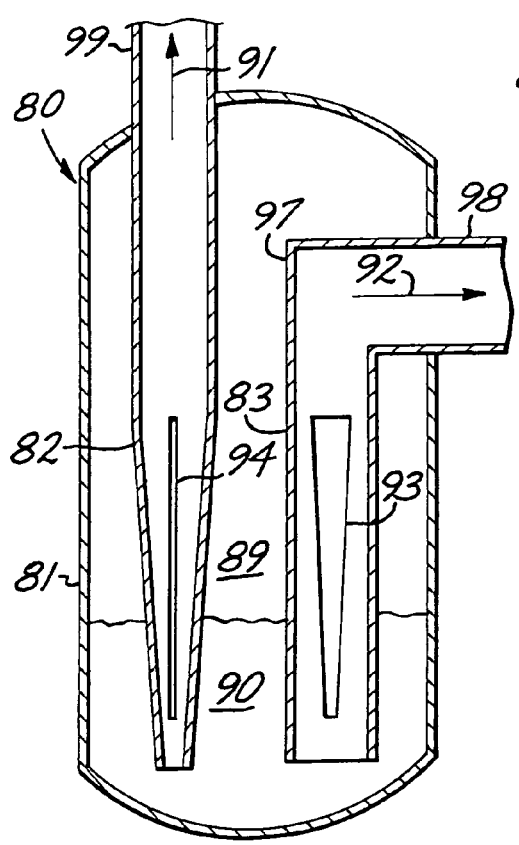
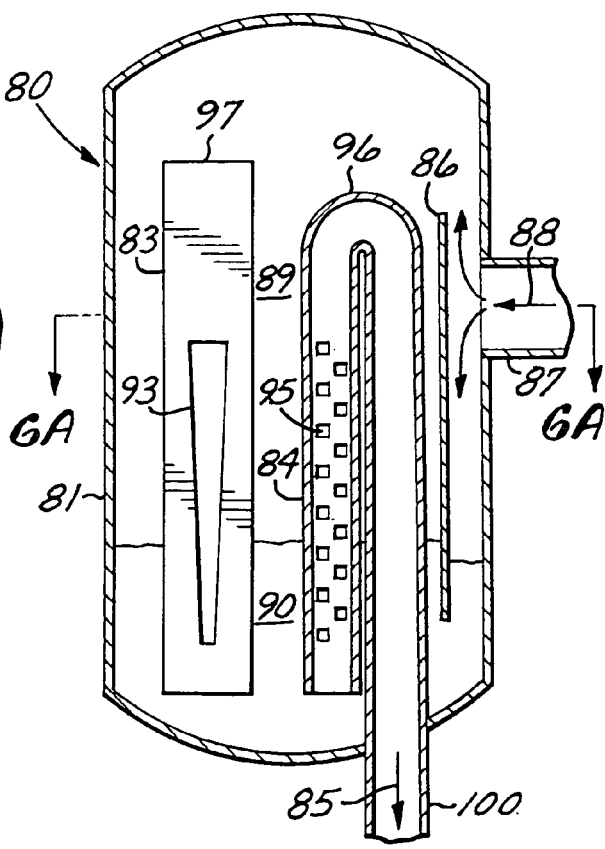

DEVICE FOR SPLITTING A TWO-PHASE STREAM INTO TWO OR MORE STREAMS WITH THE DESIRED VAPOR/LIQUID RATIOS

CROSS-REFERENCE TO RELATED APPLICATION

This application claims the benefit, under 35 U.S.C. §119(e), of co-pending provisional application No. 60/482,090; filed Jun. 24, 2003.

FEDERALLY-SPONSORED RESEARCH OR DEVELOPMENT

Not Applicable

BACKGROUND OF THE INVENTION

1. Field of the Invention

The invention relates to a device for splitting a two-phase inlet stream consisting of a light phase fluid and a heavy phase fluid, for instance vapor and liquid, into two or more two-phase outlet streams. The device will ensure that the desired vapor/liquid ratio is obtained for each of the outlet streams. The total flow rates of each outlet stream do not necessarily need to be identical. The invention is suited for but not limited to the application of splitting a two-phase process stream flowing in a pipe or channel to parallel heat exchangers, furnace tubes, air coolers, chemical reactors or piping systems.

2. Related Art

Splitting a two-phase stream is required in many process units, and historically different types of solutions have been applied, ranging from use of simple symmetrical piping splits or tee's to more sophisticated two-phase stream splitters.

The devices for splitting a two-phase process stream can be divided into 6 general types:

Type 1: Symmetrical Piping Splits Using Standard Piping Tee's.

The traditional way of splitting a two-phase stream is to make symmetrical piping splits using standard piping tee's, and to rely on the phases to distribute evenly to each branch pipe. An example of a symmetrical piping split for splitting a two-phase stream into four outlet streams is shown in the isometric drawing in FIG. 1. The two-phase inlet stream flows in the inlet pipe 1. The inlet pipe 1 routes the two-phase stream to the first tee 3, where the stream is divided into two outlet streams that flow in opposite directions in a transverse pipe 7. In the illustrated example, a first or upstream 90° elbow 2 is located upstream from the first tee 3. Due to the centrifugal forces acting on the liquid, the liquid tends to flow near the large radius wall of the elbow, while the vapor tends to flow near the small radius wall. The upstream elbow 2 thus causes phase separation and a non-uniform distribution of vapor and liquid across the cross section of the pipe. To minimize the negative effect on the splitting performance in the first tee 3 caused by the upstream elbow 2, the inlet pipe 1 is preferably perpendicular to the plane defined by the tee 3 as shown. Each of the two outlet streams from the first tee 3 is further divided into two outlet streams in second and third tee's 5a and 5b, respectively. Upstream from the second tee 5a is a second elbow 4a, and upstream from the tee third 5b is a third elbow 4b. Again in order to minimize the negative effect on the splitting performance in the tee's 5a and 5b caused by the phase separation in the elbows 4a and 4b, the pipe 7 is perpendicular to the two planes defined by the tee's 5a and 5b. By use of symmetric piping splits, the inlet stream in pipe 1 has thus been divided into four product streams flowing in outlet pipes 6a, 6b, 6c and 6d.

The symmetric piping split is probably the most widely applied method for dividing a two-phase inlet stream into two or more outlet streams. However, history has shown that this principle has failed to distribute the liquid and vapor evenly to the outlet streams, in many cases resulting in an unequal vapor-to-liquid ratio in the outlet streams. A major problem with the symmetrical piping split in standard piping tee's is that the performance of the stream split depends upon the flow regime in the upstream pipe, and that it is not always possible to stay inside the desired "dispersed flow regime" at all relevant operating conditions. The dispersed flow regime is a flow regime inside a flow channel or pipe with a uniform distribution of small liquid droplets in a continuous vapor phase or of small vapor bubbles in a continuous liquid phase (bubble flow). Also the performance of the symmetrical piping split may depend upon the presence of pipe fittings upstream from the split, as already mentioned. A major limitation of the symmetrical piping split is that the flow rate of the outlet streams needs to be close to identical to avoid significant differences in the vapor-to-liquid ratio of the outlet streams. Another limitation is that a two-phase stream can only be split symmetrically into 2, 4, 8, 16 . . . etc. outlet streams. It is thus not possible to make 3, 5, 6, 7, 9 . . . etc. outlet streams.

The performance of the symmetrical piping split in standard piping tee's has been suggested to be improved by injection of chemicals for reduction of the liquid surface tension upstream from the split. When the liquid surface tension is reduced, the dispersed flow regimes will be achieved at lower flow velocities. Therefore acceptable performance of the symmetrical piping split may be achieved over a wider range of vapor and liquid flow rates. An example is given in U.S. Pat. No. 5,190,105, where a surfactant is injected upstream from the split of a two-phase stream of saturated steam and water to a plurality of injection wells to ensure identical quality (vapor fraction) to each injection well for enhanced oil recovery from an oil reservoir.

Type 2: Use of Special Inserts such as Vanes, Baffles or Static Mixers in Piping Tee's.

Several attempts have been made to try to improve the split performance of a standard piping tee by use of pipe inserts such as vanes, baffles and static mixers.

A first example is given in U.S. Pat. No. 4,396,063, where a static mixer is located just upstream of a tee consisting of a Y-branched conduit. To achieve good splitting performance, where the vapor-to-liquid ratio of each outlet stream is identical, dispersed flow is preferred. In the dispersed flow regime the two-phase mixture will more or less act as a single-phase fluid. The small liquid droplets tend to follow the vapor flow at approximately the same velocity, or vice versa. Therefore, in the dispersed flow regime, a good splitting performance is often achieved in a piping tee. The use of a static mixer upstream from the tee provides surfaces with a certain projected area perpendicular to the flow direction in the inlet pipe. Liquid will impinge on these surfaces and will thus be separated from the vapor phase. Therefore, use of static mixers disturbs the desired dispersed flow regime, if present, and results in separation of liquid and vapor, which is unwanted. The use of static mixers introduces additional pressure drops in the process system, which may result in additional operating cost due to increased power consumption in pumps and/or compressors. Also static mixers are susceptible to fouling caused by contaminants such as scale and corrosion products.

A second example is given in U.S. Pat. No. 4,824,614. This flow splitter also includes a static mixer 22 located in the inlet pipe upstream from a tee 14 where the inlet stream 30 is divided into two outlet streams 74 and 76. Between the static mixer 22 and the tee 14, a horizontal stratifier 24 is located. The stratifier collects fluids from six different elevations. The fluids collected at the lowest and first elevation are sent to one outlet stream 76, the fluids collected at the second elevation are sent to the other outlet stream 74, the fluids collected at the third elevation are sent to the outlet stream 76, etc. As with the mixer of the first example discussed above, the mixer of the present example will tend to separate the liquid from the vapor, which is unwanted. The static mixer may also increase the operating costs and be susceptible to fouling. The stratifier collecting the fluids will only work if the vapor and liquid are distributed uniformly across the pipe cross section, which will not be the case in real applications. The Mixer/Stratifier assembly was tested in a steam/water field application described in U.S. Pat. No. 5,810,032. The result of the test was that a better split of the steam and water was obtained in a standard impacting tee than with the Mixer/Stratifier assembly.

A third example is given in U.S. Pat. No. 5,810,032. Various types of inserts for a standard pipe tee have been tested both in the laboratory with air and water, and in the field for splitting a steam/water mixture to parallel injection wells for enhanced oil recovery in an oil reservoir. Three general types of pipe inserts were investigated: A static mixer upstream from a standard tee, a vertical flow baffle upstream from a standard tee, and use of flow restrictions or nozzles in the two outlet branches of a standard tee. Combinations of these three types of inserts were also investigated. The conclusion was that the static mixer and the vertical baffle only result in marginal improvement of the split performance. The use of flow restrictions or nozzles in the two outlet branches is claimed to result in somewhat better split performance for the flow regimes tested. However it is not clear what the driving force for uniform liquid distribution to the nozzles and outlets branches of the tee is in the case of non-uniform distribution of the liquid and vapor in the cross section of the inlet pipe. None of the laboratory flow tests are carried out in Dispersed or Bubble Flow regimes (liquid droplets in a continuous vapor phase or gas bubbles in a continuous liquid phase); the evaluated flow regimes in the laboratory tests are Stratified Flow, Wavy Stratified Flow, Slug Flow, and Annular Flow, as predicted by use of the two-phase flow map by Mr. Ovid Baker ("How to size process piping for two-phase flow," *Hydrocarbon Processing*, October, 1969, pp. 105-116). That is probably the reason why it was found that the split performance of a standard tee with or without inserts is better at low flow velocities and low liquid fractions. The preferred high velocity flow regimes, Dispersed and Bubble Flow, were never tested. If tests had been performed in the Dispersed and Bubble Flow regimes, the conclusion would, most likely, have been different.

Instead of using special inserts in standard piping tees, others have suggested using significantly modified tees. Examples of modified piping tees are given in JP Patent 62059397A2, U.S. Pat. No. 4,528,919 and U.S. Pat. No. 4,512,368.

Type 3: Devices which Rely on a Certain Flow Regime to be Established Upstream from the Split.

The prediction of flow regimes in industrial applications is difficult due to the lack of accuracy of the flow regime maps. Most flow regime maps are mainly based on two-phase flow regime data for air and water in small diameter piping (<2 in. or 5 cm). Therefore, for instance, in a hydrocarbon/hydrogen system at elevated pressures and temperatures, as in a hydroprocessing unit, the flow regime maps may be inaccurate.

In addition to the uncertainty in the flow regime maps comes the uncertainty in the thermodynamic models for prediction of liquid and vapor amounts and properties. This uncertainty may be significant, for instance, for complex hydrocarbon systems where the hydrocarbons are characterized by use of pseudo components and where an equation of state is used to predict the degree of vaporization and the fluid properties.

Also piping systems in process plants are often complex systems with pipe fittings like expansions, contractions, elbows, check valves, etc. Each time a two-phase stream passes such pipe fittings, the general flow regime is disturbed, and it may require long, straight pipe runs to reestablish the general flow regime. For instance, as previously mentioned, an elbow tends to separate the phases, with the dense liquid phase running near the large radius wall of the elbow, and the lighter vapor running near the small radius wall of the elbow.

For these three reasons it is normally not possible to accurately predict the actual flow regime in a pipe or flow channel. Additionally, due to variations in operating conditions such as temperature, pressure, flow rate, and chemical composition of the fluid, it is normally not possible to stay in one flow regime for all relevant operating conditions in the process unit. Nevertheless, many two-phase stream splitters are designed to work for one flow regime only.

A first example of such a two-phase stream splitter is given in U.S. Pat. No. 4,516,986. As disclosed therein, the splitter comprises an inner pipe 12 inserted in a main pipe 10. In the annular area between the inner and main pipes a baffle 13 is located. The intended flow regime in the main pipe is the Annular Flow regime where liquid is flowing in an annular ring near the pipe wall and the vapor is flowing at high velocity in the center of the pipe. Part of the liquid flowing near the pipe wall is intended to be collected in the closed end volume 14. From the closed end volume 14 the liquid is routed through an external line 15 through a control valve 23. Vapor is collected from the annular vapor volume 30 downstream from the baffle 13 and sent through a pipe branch 11, where it is combined with the liquid from the control valve. A flow meter 20 in the two-phase stream in pipe branch 11 is used to control the liquid flow. It is not described how the flowmeter can accurately measure the vapor/liquid ratio. In order to measure vapor/liquid ratio, separate flow measurements of the vapor and liquid flow would normally be required. For other flow regimes than Annular Flow (such as, for example, Slug Flow, the split performance of the device may be poor. Even if Annular Flow is the dominating flow regime in the main pipe 10, any pipe fittings such as elbows upstream from the splitter would disturb the flow. Therefore, a certain straight pipe section is needed upstream from the splitter, which may take up additional space in the process unit. Also there may be limitations in flow rate rangeability. When the total flow rate is reduced below the design value, the pressure drop across the baffle 13 is reduced rapidly, and so is the available pressure drop across the control valve 23. At some point the control valve goes fully open and is no longer able to control the liquid flow. By introducing instrumentation and control valves, the system is no longer as simple and robust as other two-phase flow splitters, and the pressure drop across the splitter is increased. A higher pressure drop normally increases the operating cost for pumping and/or compression in the process unit. The patent describes how to generate two outlet streams. If three or more outlet streams are required, then two or more splitters in series would most likely be needed. If many outlet streams are required, then the splitting system would become rather complex, and the required pressure drop would get excessive.

A second example is given in U.S. Pat. No. 4,800,921, where a horizontal header 16 is provided with outlet branches 14a, 14b, 14c, etc., and where the upstream outlet branch is at a high elevation, and the elevation of each downstream outlet branch is reduced successively. The idea should be that if Annular Flow is the flow regime in the header, then the different elevations of the outlet branches should ensure that the thickness of the annular liquid ring is approximately the same at the point of each outlet branch. Thus, the vapor/liquid ratio in each branch stream is claimed to be close to identical. As already mentioned, it is hard to predict and to stay inside a certain flow regime for all relevant operating conditions. In addition, even if Annular Flow can be maintained in the main line, the vapor/liquid ratio is expected to be a function of total flow rate in each branch line. The higher the flow rate in a branch line, the more vapor will be sucked into the pipe, and thus the higher vapor-to-liquid ratio. If the flow regime during certain operating modes is different than expected, for instance Stratified Flow, then severe maldistribution of the phases to the outlet branches is the result.

A third example is given in U.S. Pat. No. 4,574,837, where a certain phase distribution in a horizontal main pipe 10 is assumed to be known. Openings at different elevations are provided in the main pipe to allow fluids to flow first to an annular chamber 12 and then further to a branch pipe 13. The vapor/liquid ratio of the stream in the branch pipe is set by selection of appropriate flow areas of the openings at the top and the bottom of the pipe 10, respectively. The greater the flow area at the top of the pipe relative to the flow area at the bottom, the higher the vapor-to-liquid ratio that is achieved in the branch pipe. The device will only work for the Stratified Flow and Wavy Stratified Flow regimes. Also, the device will only generate a split stream with the desired vapor-to-liquid ratio when the liquid level in the main pipe is as foreseen. Consequently, the device will only work for low flow velocities and for fixed vapor/liquid ratios and properties. Most commercial applications are characterized by high flow velocities and significant variation in vapor/liquid ratio and properties.

Other examples of stream splitters which rely on a certain flow regime to be established upstream from the split are given in U.S. Pat. No. 4,574,827 and U.S. Pat. No. 5,437,299.

Type 4: Devices which Utilize Centrifugal Forces.

In U.S. Pat. No. 5,059,226, a centrifugal two-phase flow splitter is described. The centrifugal splitter has a tangential fluid inlet 28 into a swirl chamber 23. In the bottom of the swirl chamber are a central hub 38 and vanes 39 which direct the swirling vapor and liquid toward the outlet apertures 36 and into the outlet channels 37. It is not easily understandable what the driving force for distribution of the liquid phase is. The fluid inlet is not symmetrical, since there is only one inlet 28 at one side of the device. The liquid swirls along the inner wall of the swirl chamber, but, due to the asymmetric design, uniform flow and thickness of the liquid layer/film are not expected. Consequently, some of the vanes 39 are expected to collect more liquid than others, resulting in less than optimal liquid distribution to the outlet channels 37.

Type 5: Devices which Utilize an External Energy Source to Generate Dispersed Flow.

An example of such an apparatus is given in EP Patent 0003202 B1. A motor 32 and a rotating stirring device on a shaft 28 are used to disperse the liquid and vapor mixture upstream from the split where the inlet stream is split into outlet channels 4a, 4b and 4c. The device is likely to work since a Dispersed Flow regime can be generated by addition of shaft work to the shaft 28, no matter the variations in flow rates and fluid properties. The main problem with this type of apparatus is obtaining a good seal between the shaft 28 and the pipe/bend 21, which is not an easy task (not an inexpensive design) in high pressure applications like hydrocracking (up to 300 bar). Also, the initial cost, the maintenance cost of the rotating equipment, and the cost of power consumption for the motor are all high.

Type 6: Devices which First Separate Vapor and Liquid in the Inlet Stream and then Distribute each Phase to the Outlet Streams A first example of a flow splitter for splitting a two-phase inlet stream into three outlet streams using a conventional vapor/liquid separator and conventional instrumentation is shown in FIG. 2. A two-phase inlet stream flows through a line 11 to a separator 10 where the liquid phase 13 is separated from the vapor phase 12. The vapor phase is routed via a vapor outlet line 14 to a first set of parallel control valves 15a, 15b and 15c. The position or lift of the control valves is controlled by a first set of flow controllers 16a, 16b and 16c to obtain the desired vapor flow rate through each control valve. The flow measurements are obtained by use of any conventional method, such as orifice plates or venturi tubes combined with a ΔP transmitter. The flow controllers are cascaded with a pressure controller 17. The pressure controller changes the flow set points to the flow controllers 16a, 16b, 16c in order to maintain the desired pressure in the separator 10. The liquid phase 13 is routed via a liquid outlet line 18 to a second set of parallel control valves 19a, 19b and 19c. The position or lift of these latter control valves is controlled by a second set of flow controllers 20a, 20b and 20c to obtain the desired liquid flow rate through each control valve. Flow measurements are obtained by use of any conventional method, such, as for instance, an orifice plate combined with a ΔP transmitter. The flow controllers are cascaded with a level controller 21. The level controller changes the flow set points to the flow controllers 19a, 19b and 19c in order to maintain the desired liquid level in the separator 10. Finally, the vapor streams from the valves 15a, 15b and 15c are combined with the liquid streams from the valves 19a, 19b and 19c to generate the three two-phase outlet streams 22, 23 and 24.

The instrumentation for the two-phase stream splitter shown in FIG. 2 is rather complex, and as the complexity and number of components such as transmitters, control valves and controllers are increased, the risk of failure and upsets is also increased. Some downstream systems may be damaged if the vapor-to-liquid ratio is too high or too low during such failure or upset in the control system. Examples are the risk of tube rupture or coke buildup in a furnace tube due to overheating of the tube in case the vapor-to-liquid ratio of the stream flowing inside the tube is suddenly increased. Another example is the risk of rapid coke build-up in parallel catalytic hydroprocessing reactors if the reactor is operated with too low a vapor-to-liquid ratio, resulting in hydrogen deficiency even in a short period of time. Also, the complexity of the control system and the large size of the separator vessel 10 result in a high cost of the splitter.

A second example is given in U.S. Pat. No. 4,293,025. This two-phase flow splitter includes a separator vessel 10 which has a two-phase inlet nozzle 11. An impingement plate 14 is located below the inlet nozzle to break down the high velocity of the inlet stream. Two or more chimneys 12 are provided in the separator. The upper ends of the chimneys are open to allow vapor to enter the chimney. Apertures 13 are provided in the chimneys for liquid entrance to the chimney. Caps 16 are located above the chimney openings to prevent direct liquid entrance at the chimney top. The flow of liquid to each chimney is determined by the liquid head above the apertures 13 and the flow area of the apertures. For a given liquid level in the vessel, the flow of liquid to each chimney will almost be constant. Therefore, such a two-phase stream splitter where the liquid head is the driving force for liquid distribution to the parallel outlet streams will ensure constant liquid flow to each outlet stream rather than constant vapor-to-liquid ratio. Another problem with stream splitters where the liquid head is the driving force for distribution is the limited liquid flow rangeability. The area of the apertures 13 must be sized to obtain an intermediate liquid level at the design liquid flow rate. If the liquid flow is, for example, 50% higher during some operating modes, then the liquid level will be about 2.25 times higher than the design liquid level, and liquid may thus overflow the chimneys and result in maldistribution of the liquid to the outlet streams. If the liquid flow is, for example, 50% lower than the design liquid flow, then the liquid level will only be about 25% of the foreseen liquid level. At low liquid levels, the liquid distribution performance may be poor due to a large sensitivity towards waves, non-level installation, and other fabrication tolerances. The liquid flow rangeability of the splitter can be broadened by providing apertures at more elevations. However, if apertures at more elevations are provided, then the liquid distribution performance at the design point is reduced relative to the splitter with apertures in one elevation only.

Other examples of splitters where the liquid level is the driving force for even liquid distribution to each outlet stream are given in U.S. Pat. No. 4,662,391; JP Patent 03113251 A2; and JP Patent 02197768 A2.

A third example of stream splitters with separation of the liquid and vapor phases is given in U.S. Pat. No. 5,250,104. The two-phase mixture flowing in a pipe 14 is separated in a separator 12. The vapor phase is divided into two streams in a tee 20. Each of the two vapor streams is passed through an orifice 22 and 24. The liquid is collected in a sump 30 and is passed though two parallel liquid lines 32 and 34. The pressure drop for vapor flow, $\Delta P_V$, through the orifice is almost proportional to the squared volumetric vapor velocity. The pressure drop for liquid flow, $\Delta P_L$, through the liquid lines 32 and 34, consists of a static term, $\Delta P_{SL}$, due to the difference in elevation of the liquid level in the sump 30 and the liquid tube ends 40 and 42, and a frictional term, $\Delta P_{FL}$. $\Delta P_{FL}$ is almost proportional to the squared volumetric liquid flow rate. Since the vapor and liquid paths through the splitter are parallel paths, the pressure drops need to be identical:

$$\Delta P_V = \Delta P_{SL} + \Delta P_{FL} \tag{1}$$

The flow areas of the vapor orifices and the liquid tubes are sized for a certain vapor flow rate $Q_V$ and a certain liquid flow rate $Q_L$. Now if, for instance, the actual vapor flow is 50% higher during some operating modes, then $\Delta P_V$ is 125% higher than foreseen. Since the liquid flow is unchanged, $\Delta P_{FL}$ is also unchanged. In order to fulfill equation (1), $\Delta P_{SL}$ therefore has to be increased by $1.25 \times \Delta P_V$. The result is that the liquid level in the sump 30 needs to be reduced significantly, and at some point there will be no liquid level in the sump, and both vapor and liquid will enter the liquid lines 32 and 34. In such a case, poor distribution of liquid to the parallel lines 32 and 34 will be the result. On the other hand, if the vapor flow is, for example, 50% lower than the design vapor flow during some operating modes, then $\Delta P_V$ is 75% lower than foreseen. In that case, the liquid level in the sump 30 will rise significantly and overflow the sump, causing liquid flow to the orifices 22 and 24 and maldistribution. The splitter will only work properly at the vapor flow rate and liquid flow rate for which it was designed. The liquid and vapor flow rangeability of the splitter is insufficient for most industrial applications, which are normally characterized by significant variation in both liquid and vapor flow rate and in liquid and vapor properties like density, viscosity, and surface tension.

SUMMARY OF THE INVENTION

The invention is a device for splitting a two-phase inlet stream into two or more outlet streams. The device can be designed to maintain close to identical vapor-to-liquid ratio in each of the outlet streams.

The splitter of the present invention, in one embodiment, is shown in FIGS. 3A, 3B, and 3C. The inlet stream is routed via an inlet pipe to a separator vessel. Below the inlet pipe entrance in the vessel an impingement plate is provided to break down the high velocity of the stream and to direct the stream towards the inner walls of the separator where liquid will impinge and separate from the vapor phase. In the separator vessel, separation of the liquid and vapor phases is achieved.

Inside the separator two vertical suction channels are located. These suction channels are in fluid communication with the two outlet pipes through which the outlet streams are leaving the separator. The lower ends of the suction channels are submerged in the liquid phase. The suction channels are provided with apertures in the side walls. Vapor flows though the apertures which are above the liquid level in the separator. When vapor is flowing through these apertures, a pressure drop across the wall of the suction channel is generated. Consequently, liquid is lifted up into the suction channel. The liquid is mixed with the vapor inside the suction channel, and the two-phase mixture flows upward through the channel and leaves the separator and two-phase stream splitter through the outlet pipes.

The liquid level in the separator is mainly determined by the vapor flow rate entering the vessel. At low vapor flow rates, the liquid level is high, and at high vapor flow rates, the liquid level is low. The liquid level is almost unaffected by the liquid flow rate.

Unlike the prior art as described above, the invention has all the following advantages:

A) The splitter of the present invention can be designed to maintain close to identical vapor-to-liquid ratios in the outlet streams. Alternatively, the splitter may be designed to maintain specific and different vapor-to-liquid ratios in the outlet streams.

B) The splitter of the present invention can be designed for any split ratio. The invention will also work if the actual split ratio during some operating periods is different than the split ratio that the splitter was designed for.

C) The splitter of the present invention will function equally well at all flow regimes in the inlet piping.

D) The splitter of the present invention is not sensitive to the layout of the upstream or the downstream piping systems. For instance, the performance is unaffected by the presence of pipe fittings like elbows or valves upstream the splitter.

E) By use of the splitter of the present invention, any number of outlet streams can be produced. While symmetric piping splits using impact tee's can only produce 2,4,8 . . . etc. outlet steams, the present invention can also produce 3,5,6,7,9 . . . etc. outlet streams.

F) The splitter of the present invention represents a simple and robust design. It has no instrumentation and no moving parts. It requires only low maintenance and no attention from the plant operators.

G) The splitter of the present invention is an open system, which is not susceptible to fouling. Use of the splitter in a process unit will thus not affect the overpressure protection philosophy. For hydroprocessing units, equipment located upstream from the splitter can thus still be overpressure-protected by relief valves located downstream from the splitter.

H) The pressure drop of the splitter is low (~0.05 bar at the design conditions), no matter how high the pressure drop of the downstream systems might be.

I) The splitter of the present invention represents a compact and cost-efficient design.

BRIEF DESCRIPTION OF THE DRAWINGS

FIG. 1 is an isometric view of a prior art piping system involved in a symmetric piping split, in which the inlet stream is split into four outlet streams by use of three standard piping tee's.

FIG. 2 is a process flow diagram of a prior art vapor/liquid separator with instrumentation used for splitting the inlet stream into three outlet streams.

FIGS. 3A, 3B, and 3C represent a first embodiment of the invention, wherein FIG. 3A is a side sectional view, taken along line A-A of FIGS. 3B and 3C; FIG. 3B is a cross sectional view, taken along the line B-B of FIGS. 3A and 3C; and FIG. 3C is an overhead plan view, taken along the line C-C of FIGS. 3A and 3B.

FIGS. 6A, 6B and 6C represent a second embodiment of the present invention with alternative suction channel designs, wherein FIG. 6A is a cross sectional view of the second embodiment, taken along line A-A of FIGS. 6B and 6C; FIG. 6B is a side sectional view taken along line B-B of FIGS. 6A and 6C; and FIG. 6C is a side sectional view taken along line C-C of FIGS. 6A and 6B.

FIGS. 7A, 7B, and 7C represent a third embodiment of the present invention, in which the splitter is built as an integral part of a chemical reactor, and wherein FIG. 7A is a side sectional view of the bottom part of the chemical reactor; FIG. 7B is a detailed view taken with the broken circle 7B of FIG. 7A; and FIG. 7C is a cross sectional view of the suction channel taken along line C-C of FIG. 7B.

Figure 3A:
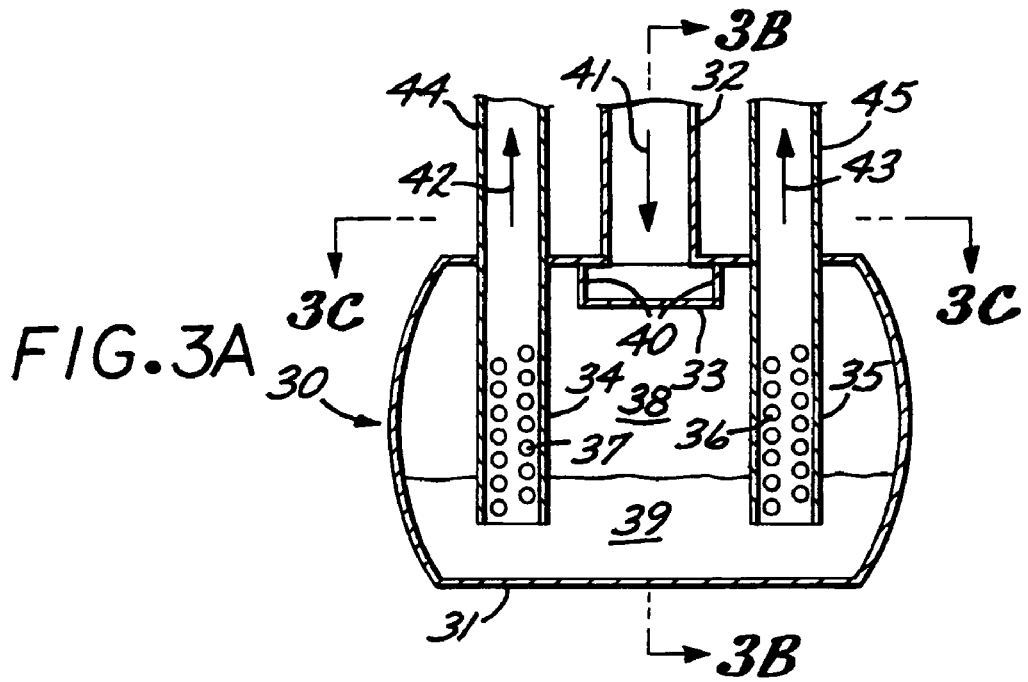

Alternative embodiments of the present invention include but are not limited to the designs shown in the figures.

DETAILED DESCRIPTION OF THE INVENTION

Splitting a two-phase stream into two or more outlet streams with identical vapor-to-liquid ratios in each outlet stream is needed upstream of many types of industrial process equipment. Examples are:

In process furnaces, parallel furnace tubes are most often used for the process fluid in order to avoid excessive furnace tube diameter and to allow for an economical furnace design. Therefore, the feed stream needs to be split to the parallel furnace tubes upstream from the furnace.

In modern process plants, parallel trains of heat exchangers, such as trains of shell and tube heat exchangers are often used. This is either to avoid excessive tube bundle diameters and/or to optimize the heat integration in the process plant.

Air cooler bundles are most often arranged in parallel due to the limitations in bundle size and due to the poor distribution of fluids to the parallel air cooler tubes in case of excessive inlet header length.

Chemical reactors, such as trickle bed reactors, may be arranged in parallel configuration. In high pressure applications, this may be done to reduce the reactor diameter and thus the overall reactor cost. In revamp of process plants where more catalyst volume needs to be added to an existing plant, the addition of a new chemical reactor in parallel rather than in series with an existing one is often very attractive from an economic point of view. The reason is that if the new reactor is added in series with the existing one, then the total reactor pressure drop increases significantly. This may result in the need for expensive replacement/upgrade of pumps and/or compressors. On the other hand, if the new chemical reactor is added in parallel, then the pressure drop may actually be reduced to allow for higher through-put in the plant even with the same pumps and compressors.

History has shown that attempts at splitting a two-phase stream in many cases has failed to produce outlet streams of equal vapor-to-liquid ratios. Examples of the consequences of unequal vapor-to-liquid ratios in the outlet streams are:

For Furnaces:

The furnace tubes receiving the high vapor-to-liquid ratio stream gets hotter than the furnace tubes receiving the low vapor-to-liquid ratio stream due to the lower heat capacity of vapor relative to liquid. Therefore, the maximum allowable tube metal temperature may be reached even below the heat duty that the furnace was rated for. The furnace can thus not transfer the heat that it was originally designed for. The consequences may be lower production rates from the process unit. In hydrocarbon service the hotter tube metal temperature results in increased coke formation rate on the tube wall. The result may be that premature shut down of the unit for decoking the furnace tubes is needed. Finally, if the vapor and liquid are distributed to each parallel furnace tube by automatic control systems, such as flow control valves, then in case of failure of the control system, one or more furnace tubes may suddenly not receive any liquid feed at all. The consequence could be overheating and rupture of the furnace tube.

For Heat Exchangers and Air Coolers:

For parallel heat exchangers and air coolers, the overall thermal performance is significantly reduced in case of unequal vapor-to-liquid ratios, especially in critical applications with close temperature approach between the cold and the hot streams. For instance, if a heat transfer system consists of two parallel heat exchangers A and B, and exchanger A is receiving a high vapor-to-liquid ratio stream while exchanger B is receiving a low vapor-to-liquid ratio stream, the driving ΔT in exchanger A is lower due to the lower heat capacity of this stream. The transferred heat duty in exchanger A is therefore lower. In exchanger B the driving ΔT is higher due to the higher heat capacity of this stream. The transferred heat duty in exchanger B is therefore higher. However, the increased heat transfer in exchanger B is not high enough to compensate for the low heat transfer in the exchanger A. The overall effect is a significant reduction of the total heat transferred in the exchangers. The consequence of lower than expected heat transfer in exchangers may be lower production rates from the process unit, which has severe economic consequences.

For some cases, uneven distribution of liquid to parallel exchangers may also result in fouling, plugging and/or corrosion. One example is parallel heat exchangers with vaporization of a liquid. Normally, process plants are designed to avoid complete vaporization inside an exchanger. In other words, going through "the dry point" is avoided. The reason is that there will always be contaminants in process streams which do not evaporate. If "the dry point" occurs at some location in the exchanger, these contaminants settle out on the heat transfer surfaces since the liquid which they where originally dissolved or dispersed in has now disappeared. Now if one of the parallel exchangers is receiving significantly less liquid than anticipated, then the dry point may occur in this exchanger even though it was not foreseen in the design of the plant. The result may be severe fouling and/or plugging problems in this exchanger, followed by low heat transfer rate and the need for a premature shut down of the unit for cleaning the exchangers.

Another example is the product air cooler bundles in a hydroprocessing unit. When the reactor effluent is cooled down, ammonia salts like $NH_4Cl$ and $NH_4HS$ will precipitate and may cause severe corrosion and plugging problems. Therefore wash water is added to dissolve these salts. However, history has shown that splitting the process stream, including the wash water, to parallel air cooler bundles results in poor distribution of wash water, and corrosion and plugging problems in the bundles receiving little or no wash water.

For Chemical Reactors:

For parallel chemical reactors, such as trickle bed reactors in a hydroprocessing unit, achieving identical vapor-to-liquid ratios at the inlet of each reactor is of highest importance. In a hydroprocessing reactor, such as a hydrocracking or hydrotreating reactor, where hydrocarbon components are reacted with hydrogen in the presence of a solid catalyst, a low vapor-to-liquid ratio feed to a reactor will result in lower hydrogen partial pressure in the reactor which will again result in a lower rate of reaction, high coke build-up rate, and catalyst deactivation. Even short operating periods with too low vapor-to-liquid ratio of the feed to a reactor may result in severe damage to the expensive load of catalyst particles in the reactors.

The splitter of the present invention can be designed to handle any required split ratio. Split ratio is defined as the total mass flow of an outlet stream divided by the total mass flow of the inlet stream. For example, the invention can be designed for a 50%/50% split, but also for a 5%/95% split. Since the two-phase splitter is an open system without any control valves and with low overall pressure drop, it is the hydraulic capacity of the downstream flow systems, and not the two-phase splitter itself, which sets the split ratio. When properly designed, the splitter will ensure that the vapor-to-liquid ratios in each of the outlet streams are close to identical, even if the split ratio deviates from the split ratio that the two-phase splitter was designed for. The reason is explained here:

Say that a stream splitter has been designed to split a two-phase inlet stream into two outlet streams with split ratios of 30%/70% for suction channels A and B, respectively. Such a design will normally result in differently sized apertures in the two suction channels and different cross sectional areas of the two suction channels. Now, during some operating modes, the split ratio could maybe be 40%/60% instead of the 30%/70% that the two-phase splitter was designed for. In that case, more vapor than originally anticipated is flowing through the apertures in the side of suction channel A. The pressure drop from the outside to the inside of suction channel A is therefore larger. Consequently, more liquid is lifted up into the suction channel A. Less vapor than originally anticipated is flowing through the apertures in the side of suction channel B due to the lower split ratio for this suction channel. The pressure drop from the outside to the inside of suction channel B is therefore lower. Consequently, less liquid is lifted up into the suction channel B. In that way, the design tends to compensate for the different split ratio.

If the split ratio for a given suction channel during certain operating modes is higher than anticipated, then the higher vapor flow will result in a higher liquid flow. Similarly, if the split ratio for a given suction channel is lower than anticipated, then the lower vapor flow will result in a lower liquid flow. The result is that the vapor-to-liquid ratio in the outlet pipe is only affected by the changed split ratio to a low extent.

Figure 4:
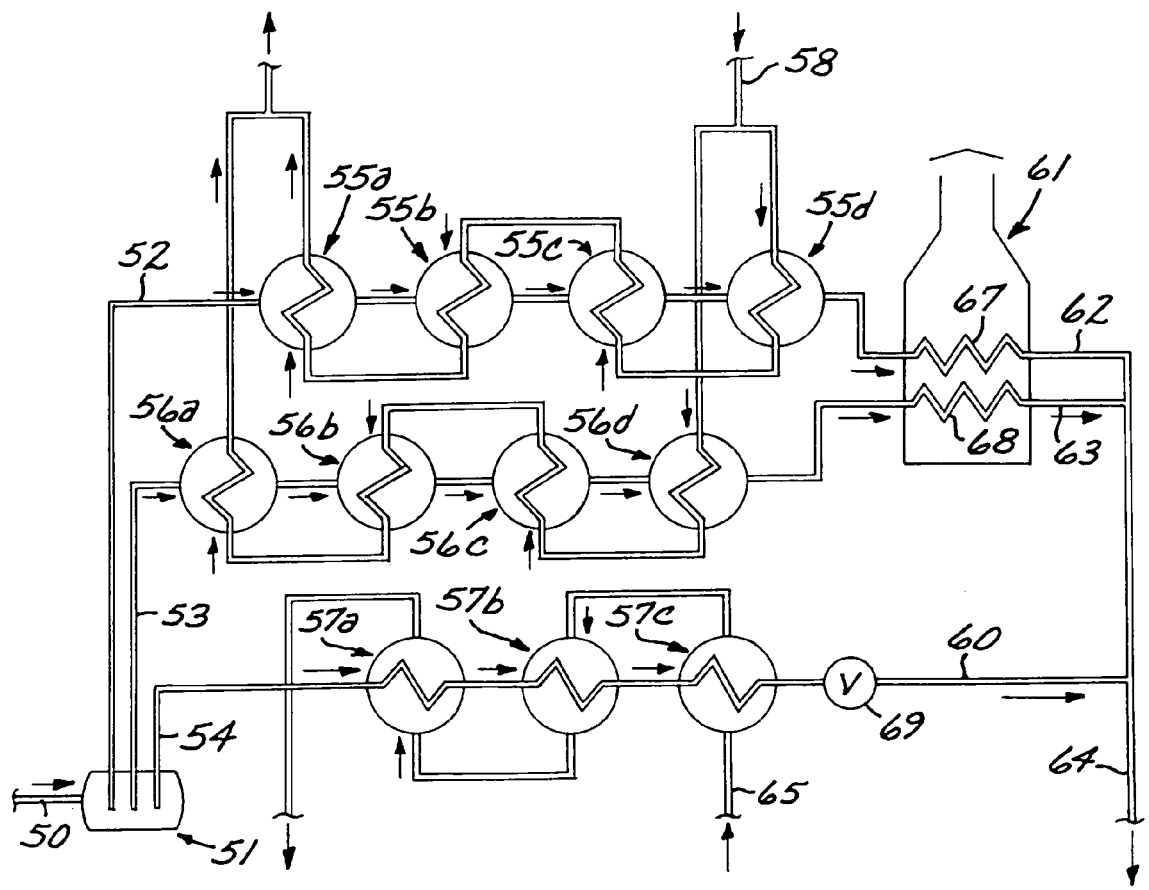
FIG. 4 is a process flow diagram showing a first example of an application of the splitter of the present invention, in which the splitter is used to split a two-phase stream to three parallel process systems comprising heat exchangers, instrumentation and furnace tubes.

A first example of the ability of the splitter to keep identical vapor-to-liquid ratios in the outlet streams is given in FIG. 4 that shows a process flow diagram of a process system with parallel heat exchangers, instrumentation and furnace tubes. The cold two-phase feed stream 50 needs to be heated up by heat exchange with the hot streams 58 and 65 and by use of a furnace 61. The cold stream 50 is first split into three streams 52, 53 and 54 by use of a splitter 51 in accordance with the present invention. The outlet stream 52 is passed through train A which consists of the shell sides of shell and tube heat exchangers 55a, 55b, 55c and 55d and a first tube pass 67 of the furnace 61. The outlet stream 53 is passed through train B which consists of the shell sides of shell and tube heat exchangers 56a, 56b, 56c and 56d and a second tube pass 68 of the furnace 61. The outlet stream 54 is passed through train C which consists of the tube sides of shell and tube heat exchangers 57a, 57b and 57c and a control valve 69. The outlet streams 62, 63 and 60 from trains A, B, and C, respectively, are combined in the product stream 64. The design vapor and liquid flow rates and properties for the splitter 51 are given in table 1.

TABLE 1

Vapor and liquid design flow rates and properties for splitter 51 in FIG. 4

|  | Design case |
| --- | --- |
| Vapor flow, m³/hr | 1400 |
| Vapor density, kg/m³ | 9.5 |
| Vapor viscosity, cP | 0.018 |
| Liquid flow, m³/hr | 260 |
| Liquid density, kg/m³ | 765 |
| Liquid viscosity, cP | 0.36 |
| Liquid surface tension, dynes/cm | 14.7 |

The splitter 51 was designed for a split ratio of 40%/40%/20% to trains A, B, and C, respectively. Achieving identical vapor-to-liquid ratios in the three outlet streams 52, 53 and 54 was aimed at. When the actual split ratio is identical to the design split ratio of 40%/40%/20%, the vapor-to-liquid ratios in the three outlet streams 52, 53 and 54 will be close to identical. However, it turned out that the pressure drop for a given flow rate was 20% higher for train A than anticipated. The difference in flow resistance was due to different piping layouts and slightly different exchanger and furnace designs for the two parallel trains A and B. Also, it turned out that the pressure drop for a given flow rate was 30% lower for train C than originally anticipated. The lower flow resistance of train C was due to a higher flow requirement controlled by the control valve 69. Due to the different flow resistances of the parallel flow systems, the split ratio became different from what was foreseen.

Now, the difference in vapor-to-liquid ratio in each parallel train caused by the different from anticipated flow resistances of trains A and train C is evaluated for 9 sets of vapor and liquid flow rates. The sets of vapor and liquid flow rates evaluated and the results are given in table 2. The vapor and liquid flows corresponds to 50%, 100%, and 200% of the vapor and liquid design flow rates, respectively. The results from the evaluation, such as ΔP across the splitter, ΔP across the three trains, the vapor-to-liquid volumetric ratio for the streams 52, 53 and 54, and the % DVLR are also given in table 2. % DVLR is defined as:

$$\% \, DVLR = \frac{1}{Nsplit} \sum_{i=1}^{Nsplit} \frac{abs[VL_i - VL_{feed}]}{VL_{feed}} \times 100\% \quad (2)$$

where $VL_i$, and $VL_{feed}$ are the volumetric vapor to liquid ratios of outlet stream i and the inlet feed stream respectively, and where Nsplit is the number of outlet streams from the splitter.

As seen from table 2, the given splitter design shows excellent performance over a very wide range of vapor and liquid flow rates, even when the flow resistances of the downstream systems are different from those originally designed for. The vapor-to-liquid ratio varies from 1.3 to 21.5 and the pressure drops of the trains vary from 1.3 bar to 20.9 bar. The average % DVLR caused by the 20% higher flow resistance of train A and the 30% lower flow resistance of train B is as low as 2.97%.

TABLE 2

Performance of splitter 51 with different than expected flow resistance of downstream systems.

| Vapor flow, m³/hr | Liquid flow, m³/hr | ΔP of splitter 51, bar | ΔP of each of trains A, B and C, bar | Vapor/Liquid volumetric ratio | | | % DVLR |
| --- | --- | --- | --- | --- | --- | --- | --- |
|  |  |  |  | Stream 52 | Stream 53 | Stream 54 |  |
| 700 | 130 | 0.02 | 1.34 | 5.84 | 5.39 | 4.74 | 6.89 |
| 1400 | 130 | 0.03 | 2.58 | 11.63 | 10.78 | 9.57 | 6.40 |
| 2800 | 130 | 0.07 | 5.51 | 22.42 | 21.53 | 20.27 | 3.34 |
| 700 | 260 | 0.03 | 2.96 | 2.78 | 2.69 | 2.56 | 2.77 |
| 1400 | 260 | 0.05 | 5.25 | 5.57 | 5.38 | 5.11 | 2.82 |
| 2800 | 260 | 0.09 | 10.1 | 10.87 | 10.59 | 10.20 | 2.11 |
| 700 | 520 | 0.07 | 7.35 | 1.36 | 1.35 | 1.33 | 0.71 |
| 1400 | 520 | 0.10 | 11.7 | 2.72 | 2.69 | 2.65 | 0.87 |
| 2800 | 520 | 0.15 | 20.9 | 5.43 | 5.38 | 5.30 | 0.82 |
|  |  |  |  |  |  | Average: | 2.97 |

The performance of the splitter is affected by the mechanical tolerances during fabrication and installation of the splitter. The relative elevation of the suction channels and the flow area of the apertures in the suction channels especially affect the performance.

Figure 5:
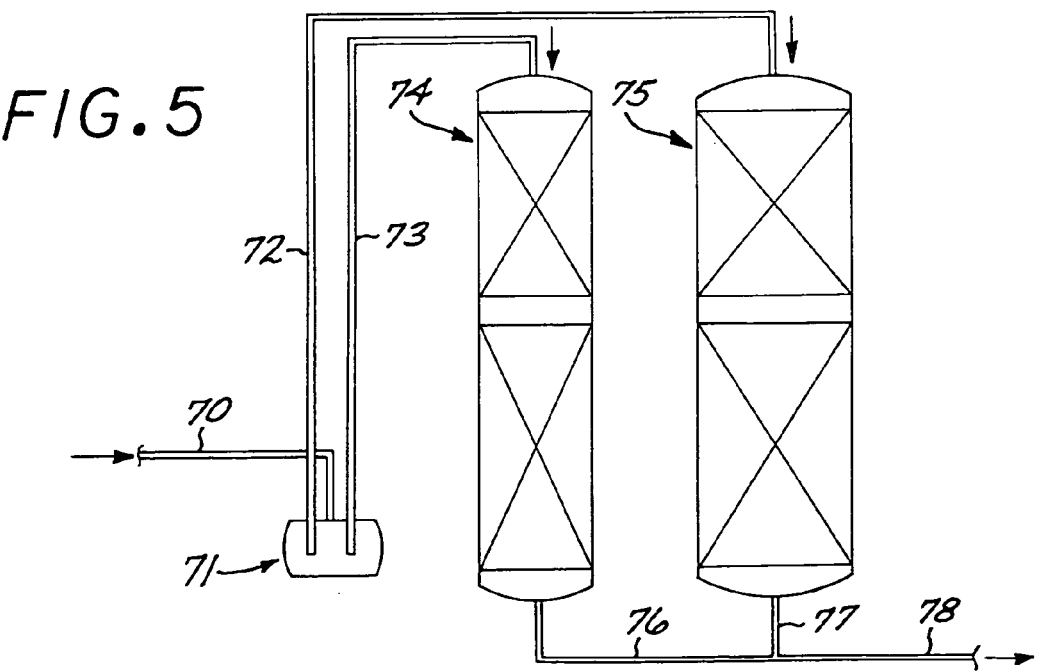
FIG. 5 is a process flow diagram showing a second example of an application of the splitter of the present invention, in which the splitter is used to split a two-phase stream to two parallel trickle bed chemical reactors.

A second example of an application of the splitter of the present invention is shown in the process flow diagram in FIG. 5. An existing trickle bed reactor 75 loaded with 190 m³ of catalyst particles is too small to produce the desired product at the desired rate. Therefore, 90 m³ of additional catalyst volume needs to be added. Instead of adding the new catalyst volume in series with the existing reactor, a new reactor 74 is installed in parallel with the existing reactor 75. A splitter 71 of the present invention is used to split the two-phase feed stream 70 into two outlet streams 72 and 73 which are fed to the reactors 75 and 74, respectively. The split ratio is 32%/68% to reactors 74 and 75, respectively. Downstream from the reactors, the outlet stream 76 from the new reactor 74 is combined with outlet stream 77 from the existing reactor 75 into the product stream 78. The suction channels in the splitter 71 are intended to be at same elevation, but in this example, the suction channel A corresponding to the stream 72 is elevated 10 mm higher than the Suction channel B corresponding to the stream 73. Also, the flow area of the apertures in Suction channel A is 2% larger than intended, and the flow area of the apertures in Suction channel B is 2% lower than intended. Both the elevation difference of the suction channels and the difference in the flow area of the apertures will increase the vapor-to-liquid ratio of the stream 72 relative to the stream 73.

The splitter 71 has been designed for the vapor and liquid flow rates and properties given in table 3.

TABLE 3

Vapor and liquid design flow rates and properties for splitter in FIG. 5

| | Design case |
|---|---|
| Vapor flow, m³/hr | 1170 |
| Vapor density, kg/m³ | 27.0 |
| Vapor viscosity, cP | 0.022 |
| Liquid flow, m³/hr | 421 |
| Liquid density, kg/m³ | 566 |
| Liquid viscosity, cP | 0.115 |
| Liquid surface tension, dynes/cm | 4.5 |

Now, the difference in vapor-to-liquid ratio, % DVLR, as defined in equation (2) caused by the above mentioned fabrication and installation tolerances is evaluated for a broad range of operating conditions. The operating conditions evaluated are given in table 4 and correspond to 50%, 100% and 200% of the vapor and liquid design flow rates, respectively. The results from the evaluation, such as ΔP across the splitter, ΔP across the reactors, the vapor-to-liquid volumetric ratio for the streams 72 and 73, and the % DVLR, are also given in table 4.

TABLE 4

Performance of splitter with worst case fabrication and installation tolerances.

| Vapor flow, m³/hr | Liquid flow, m³/hr | ΔP of splitter 71, bar | ΔP of each reactor, bar | Vapor/Liquid volumetric ratio | | % DVLR |
|---|---|---|---|---|---|---|
| | | | | Stream 72 | Stream 73 | |
| 585 | 211 | 0.02 | 0.53 | 2.87 | 2.58 | 5.20 |
| 1170 | 211 | 0.04 | 1.00 | 5.72 | 5.20 | 4.69 |
| 2340 | 211 | 0.08 | 2.22 | 11.39 | 10.49 | 4.07 |
| 585 | 421 | 0.04 | 1.23 | 1.44 | 1.30 | 5.00 |
| 1170 | 421 | 0.06 | 2.04 | 2.86 | 2.62 | 4.29 |
| 2340 | 421 | 0.09 | 3.19 | 4.65 | 4.27 | 4.17 |
| 585 | 842 | 0.08 | 3.33 | 0.72 | 0.64 | 6.01 |
| 1170 | 842 | 0.12 | 4.82 | 1.43 | 1.30 | 4.56 |
| 2340 | 842 | 0.19 | 8.08 | 2.85 | 2.63 | 3.99 |
| | | | | | Average: | 4.66 |

As seen from table 4, excellent splitting performance is achievable over a very broad range of vapor and liquid flow rates even with worst case fabrication and installation tolerances.

For the two examples of FIGS. 4 and 5, the splitter was designed to produce outlet streams with identical vapor-to-liquid ratios. The stream splitter can also be designed to produce outlet streams of different vapor-to-liquid ratios. For example, the splitter could be designed to split a two-phase inlet stream into three outlet streams with split ratios of 20%/20%/60%, and with vapor-to-liquid volumetric ratios of 10/12/20. In most industrial applications of two-phase stream splitters, identical vapor-to-liquid ratios are, however, desired in the outlet streams.

The separation of vapor and liquid in the separator of the present invention does not necessarily need to be as good as in a traditional phase separator. It is sufficient that the bulk part of the liquid is separated from the vapor. Smaller liquid droplets passing with the vapor will be distributed to the suction channels also, since the vapor is distributed evenly. The separator of the two-phase stream splitter can therefore be designed for higher linear vapor velocities and thus smaller cross sectional area than traditional phase separators. Also, the required liquid hold-up time is significantly lower for the separator of the two-phase stream splitter than for a traditional separator with instrumentation like the one shown in FIG. 2. Traditional separators with instrumentation have a liquid hold-up time of 5-20 minutes to allow for response time for the level control system and to allow for operators to take manual action in case of failure of the automatic control system. For the two-phase stream splitter the level is fixed more or less instantaneously and is mainly set by the vapor load. The liquid hold-up time in the separator of the two-phase stream splitter may therefore be as low as 5 seconds. The overall result is that the separator of the two-phase stream splitter is very compact compared to traditional phase separators used in the process industry. As an example, the size and cost of the pressure vessel of the splitter 51 in FIG. 4, designed for the vapor and liquid rates and properties in table 1, is compared with the size and cost of the pressure vessel of a conventional phase separator as shown in FIG. 2. The conventional phase separator is also designed for the vapor and liquid flows and properties from table 1. The results are given in table 5.

TABLE 5

Comparison of size and cost of the pressure vessel of the splitter and of a conventional separator.

| | Splitter 51 from FIG. 4 | Conventional phase separator |
|---|---|---|
| Vessel inner diameter, mm | 800 | 2750 |
| Vessel tangent length, mm | 1830 | 9700 |
| Design pressure, bar | 80 | 80 |
| Design temperature, °C. | 230 | 230 |
| Material of construction | Carbon Steel | Carbon Steel |
| Estimated equipment cost, USD (2003) | 21,600 | 374,000 |

The cost given in table 5 is the cost of the vessel plus internals such as the suction channels. The installation cost, including foundation, erection, insulation, piping, and instrumentation, etc., is not included. The total installed cost is typically 3-4 times the equipment cost given in table 5. As seen from table 5, the splitter of the present invention represents a compact and low cost option relative to the use of a conventional phase separator.

FIGS. 3A, 3B, 3C, 6A, 6B, 6C, 7A, 7B, 7C, and 8 represent alternative structures of the splitter of the present invention. The figures are presented only to exemplify the invention and alternatives. They are not intended to limit the scope of the concepts disclosed herein or to serve as working drawings. They should not be construed as setting limits on the scope of the inventive concept. The relative dimensions shown by the drawings should not be considered equal or proportional to commercial embodiments.

Figure 3B:
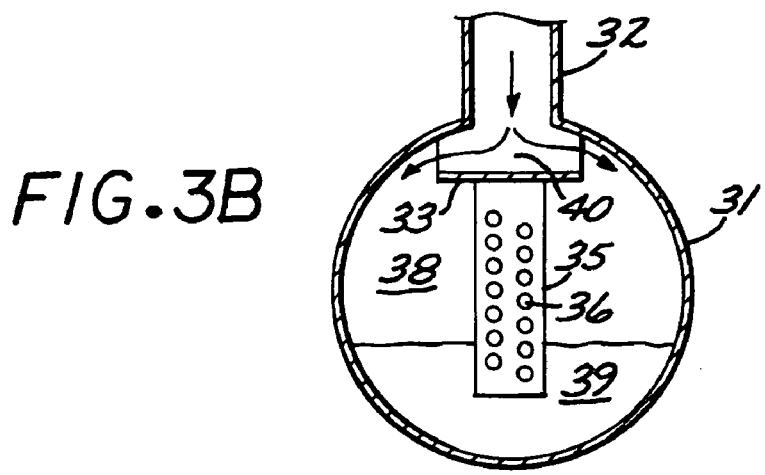
Figure 3C:
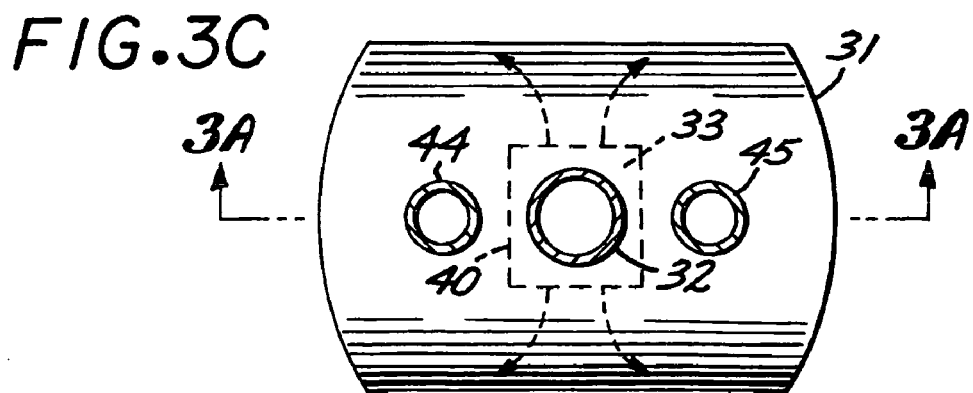

Now referring to the drawings of the embodiments of the present invention, the splitter 30 shown in FIGS. 3A, 3B and 3C is a splitter for splitting an inlet stream 41 into two outlet streams 42 and 43. The splitter 30 consists of a vessel 31 with an inlet pipe 32 and two outlet pipes 44 and 45. The inlet pipe 32 is connected to the wall of the vessel 31 to form a fluid tight seal. The lower end of the inlet pipe 32 is open to allow the inlet stream 41 to enter into vessel 31. Below the inlet pipe 32 is an impingement plate 33 with side walls 40. The impingement plate 33 and the side walls 40 form a flow channel which first split the inlet stream 41 into two streams and then direct these two streams towards the cylindrical wall of vessel 31. Two essentially vertical suction channels 34 and 35 are located in the vessel 31. Each suction channel consists of a circular pipe with open upper and lower ends. The lower end of each suction channel is submerged in the liquid 39. The upper end or outlet of the suction channel 34 is connected to the outlet pipe 44 and the upper end or outlet of the suction channel 35 is connected to the outlet pipe 45 to form two flow channels out of the vessel 31. Fluid tight seals are provided between the walls of the vessel 31 and the outlet pipes 44 and 45. The suction channel 34 is provided with apertures 37 in the sides of the pipe and the suction channel 35 is provided with apertures 36 in the side of the pipe.

Now, during operation, the two-phase inlet jet or stream 41 enters the vessel 31 through the inlet pipe 32. The two-phase jet hits the impingement plate 33 which brakes down the high velocity of the stream and directs the stream toward the cylindrical walls of the vessel 31. Inside the vessel 31, the liquid phase 39 separates from the vapor phase 38. The liquid phase collects in the heavy phase collection region in the bottom of the vessel 31, while the vapor phase is in the light phase collection region in the upper part of the vessel. The vapor 38 now flows through the fraction of the apertures 36 and 37 in the sides of the suction channels 34 and 35 that are above the liquid surface. The flow through the apertures results in a pressure drop from outside the suction channels to inside the suction channels, and therefore liquid is lifted up into the suction channels. The liquid 39 flows through the lower open ends of the suction channels 34 and 35 and through the fraction of the apertures 36 and 37 that are below the liquid surface in vessel 31. The liquid mixes with the vapor in the suction channels, and the two-phase mixture flows upward inside the suction channels to the outlets thereof and out of vessel 31 through the outlet pipes 44 and 45.

The feed inlet is preferably located symmetrically between the suction channels, as indicated in FIG. 3A. This will result in the minimum cross sectional area of the vessel required for vapor/liquid separation, and it will also distribute small liquid droplets that are taking the vapor path more evenly. The splitter is preferably designed so that the feed inlet stream impinges or impacts plates and walls, as shown in FIGS. 3B and 3C. When the inlet feed stream impinge plates and walls, liquid tends to separate from the vapor phase, and also it prevents the high velocity inlet jet from reaching the liquid surface in the vessel, which could result in liquid re-entrainment and waves.

The total area of the apertures in the suction channels is selected to obtain the desired liquid level in the vessel. A larger area of the apertures results in a lower pressure drop of the vapor and therefore a higher liquid level, so that the lower pressure drop matches the vertical height that the liquid needs to be lifted up. Conversely, a smaller area results in a lower liquid level. The area of the apertures in each suction channel can be used to set the vapor-to-liquid ratio of the outlet stream from that suction channel. If the area of the apertures in a suction channel A is increased relative to the area of the apertures in another suction channel B, then the vapor-to-liquid ratio of the outlet stream from the suction channel A is increased relative to the vapor-to-liquid ratio from the suction channel B. The cross sectional area and shape of each suction channel also affects the liquid level in the vessel and the vapor-to-liquid ratio of each outlet stream.

The apertures in the suction channels shown in FIG. 3A are circular holes. However, these apertures can also be vertical slots or have other shapes, such as V-shape, triangular, rectangular, polygonal, ellipsoidal, etc. The area of the apertures does not necessarily need to be evenly distributed over the height of the suction channel. For instance, a suction channel may have a smaller area of the apertures near the bottom end and a larger area of the apertures near the top end.

The suction channels shown in FIGS. 3A and 3B have circular cross sections, but the suction channels can also have many other cross sectional shapes, such as triangular, rectangular, ellipsoidal, polygonal, etc. Also the cross sectional area of the suction channels may vary along the length of the suction channel.

The bottom ends of the suction channels shown in FIG. 3A are open for liquid flow. However, in many cases, improved splitting performance can be achieved if the bottom ends of the suction channels are closed and all liquid therefore needs to pass through the apertures in the sides of the suction channels that are below the liquid surface.

The suction channels of the splitter shown in FIGS. 3A and 3B are vertical. However the suction channels do not need to be entirely vertical. It is sufficient that the suction channel has a vertical component, or, in other words, that the liquid is constrained by the suction channel to flow upward past the apertures for inlet of vapor before reaching the outlet of the suction channel leading into one of the outlet pipes 44 and 45.

The vessel 31 of the splitter in FIGS. 3A, 3B and 3C is a horizontal, cylindrical vessel with ellipsoidal heads. However the separator or vessel of the present invention may have any shape and orientation. Other examples of vessel shapes and orientations are vertical cylindrical vessels, spherical vessels, box shaped vessels with rectangular cross sections, etc.

The inlet and outlet streams enter and exit through the top wall of the vessel 31 in FIGS. 3A, 3B, and 3C. However, the inlet and outlet streams may enter and exit through other walls, such as the bottom or side walls.

Examples of variations of the present invention are illustrated for the splitter shown in FIGS. 6A, 6B, and 6C. The splitter 80 consists of a vertical cylindrical vessel 81. The splitter has an inlet stream 88 entering via an inlet pipe 87 through the side wall of vessel 81. A vertical splash plate 86 is located downstream from this inlet. The splitter has three outlet streams 91, 92 and 85. The first outlet stream 91 flows via a first outlet pipe 99 through the top wall of the vessel 81. The first outlet pipe 99 is connected in a leak free manner to a first suction channel 82. The first suction channel 82 has a circular cross section and is tapered so that the cross sectional area of the channel decreases downwardly. The first suction channel 82 is provided with four vertical slots 94. The first suction channel 82 is open for liquid flow in the bottom end. The second outlet stream 92 flows via a second outlet pipe 98 through the side wall of vessel 81. The second outlet pipe 98 is connected in a leak free manner to a second suction channel 83 by use of a 90° bend 97. The second suction channel 83 has a square cross section. The second suction channel 83 is provided with four V-shaped slots 93. The second suction channel 83 is open for liquid flow in the bottom end. The third outlet stream 85 flows through a third outlet pipe 100 through the bottom wall of vessel 81. The third outlet pipe 100 is connected in a leak free manner to a third suction channel 84 by use of a 180° bend 96. The third suction channel 84 has a circular cross section and is provided with square apertures 95. The third suction channel 84 is closed for liquid flow in the bottom end, and all liquid therefore has to flow through the square apertures 95.

During operation, the two-phase inlet stream 88 enters the vessel 81 through the inlet pipe 87. The two-phase jet hits the splash plate 86 which brakes down the high velocity of the stream and results in some degree of phase separation. Inside the vessel 81, the liquid phase 90 separates from the vapor phase 89. The liquid phase collects in the bottom of the vessel, while the vapor phase is in the upper part of the vessel. The vapor 89 now flows through the apertures 93, 94 and 95 in the sides of the suction channels 83, 82 and 84, respectively. The vapor flow through the apertures results in a pressure drop from outside the suction channels to inside the suction channels, and therefore liquid is lifted up into the suction channels. Liquid 90 flows through the lower open ends of the first and second suction channels 82 and 83, and through the fraction of the apertures 93, 94 and 95 that are below the liquid surface in vessel 81. The liquid mixes with the vapor in the suction channels, and the two-phase mixture flows inside the suction channels and out of the vessel 81 through the outlet pipes 98, 99 and 100.

The splitting performance of the present invention, quantified as % DVLR as defined in equation (2), is reduced in high vapor-to-liquid ratio applications. In high vapor-to-liquid ratio applications, the performance of the present invention can be significantly improved by use of inserts inside the suction channels to increase the pressure drop for the two phase flow inside the suction channels.

Use of one or more orifices in the suction channel is one example of such inserts for increasing the pressure drop and for the improvement of splitting performance. In addition, the use of inserts inside the suction channel has an effect on the two-phase flow pattern in the suction channel. For instance, the use of orifices tends to eliminate the unwanted Slug Flow where liquid slugs and vapor pockets periodically flow in the suction channel. The largest improvement in splitting performance by use of suction channel inserts is achieved in high vapor-to-liquid ratio applications, but also, for applications with lower vapor-to-liquid ratios, some improvement is achieved. For instance, the splitters 51 and 71 in FIGS. 4 and 5, respectively, did include inserts in the suction channels for improving the splitting performance.

The splitters 30, 51, 71 and 80 in FIGS. 3A, 3B, 3C, 4, 5, 6A, 6B and 6C all have their own separator or vessel. However, the present invention may be used as an integral part of other process equipment, such as, for instance, shell and tube heat exchangers and chemical reactors.

Figure 7A:
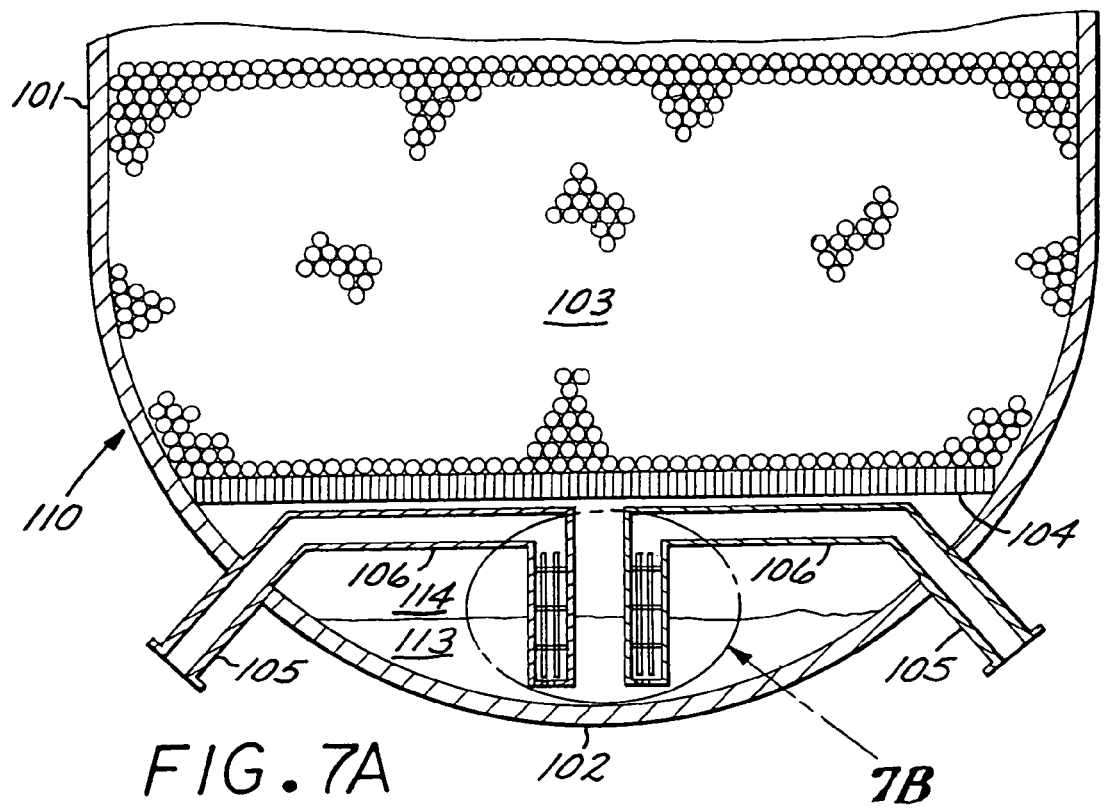
Figure 7B:
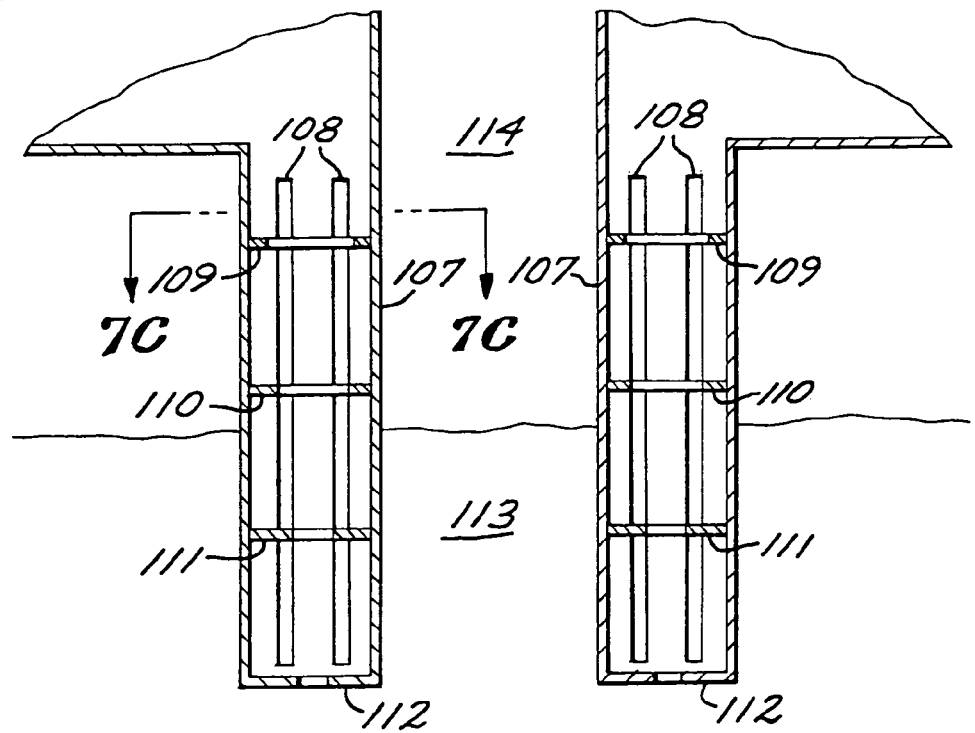
Figure 7C:
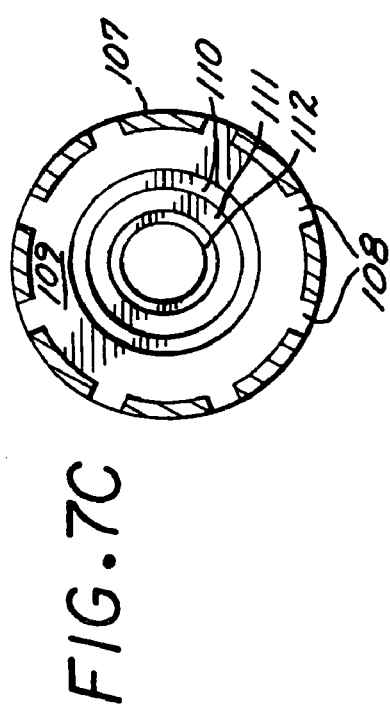

FIGS. 7A, 7B, and 7C show an example of a splitter of the present invention which is an integral part of a chemical trickle bed reactor 110. FIGS. 7A and 7B show the bottom part of this trickle bed reactor. Catalyst particles 103 are loaded inside a cylindrical pressure shell 101 with hemispherical heads 102. The catalyst is supported by a catalyst support grid or screen 104. The catalyst support grid/screen is designed so that the catalyst particles can not move through the screen, but the vapor and liquid can. Below the catalyst support grid/screen, two vertical suction channels 107 are located. Each suction channel is provided with several (preferably eight) slots 108. The suction channels are also provided with inserts to increase the pressure drop of the suction channel. These inserts consist of four orifices 109, 110, 111 and 112 for each suction channel. Each suction channel 107 is connected to an outlet nozzle 105 in a leak free manner by use of channels 106 with bends.

During operation, vapor and liquid flow concurrently down through the bed of catalyst particles 103 and through the catalyst support grid/screen 104. Below the catalyst support grid/screen 104 is an open space where the liquid phase 113 separates from the vapor phase 114. The liquid phase 113 collects in the bottom of the reactor. The vapor 114 now flows through the fraction of the slots 108 that are above the liquid surface. The flow through the slots results in a pressure drop from outside the suction channel to inside the suction channel, and therefore liquid is lifted up into the suction channel. Liquid 113 flows through the opening of the lower orifices 112 and through the fraction of the slots 108 that are below the liquid surface. The liquid mixes with the vapor in the suction channel and flows through the suction channel and the orifices and out of the reactor 110 through the nozzles 105.

Figure 8:
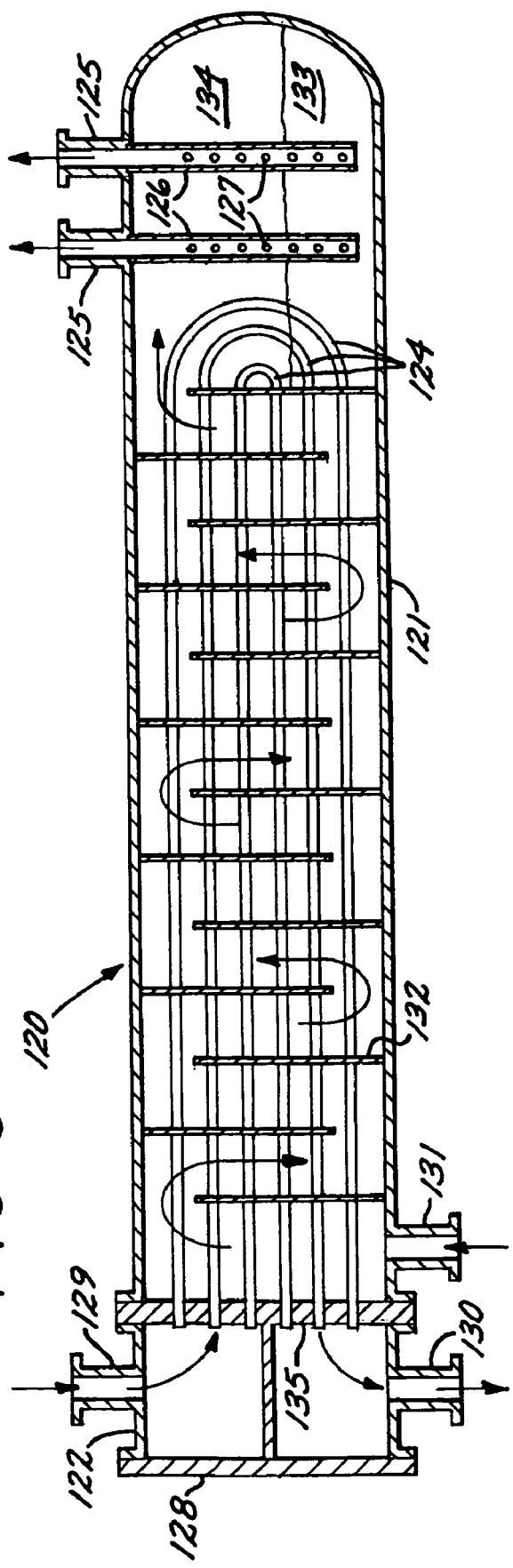
FIG. 8 is a side sectional view of a heat exchanger and splitter in accordance with another embodiment of the present invention, in which the splitter is build as an integral part of a shell and tube heat exchanger.

FIG. 8 is showing an example of a splitter of the present invention which is an integral part of a shell and tube heat exchanger 120. The shell and tube heat exchanger comprises:

A head 122 with cover plate 128, tube side inlet nozzle 129 and tube side outlet nozzle 130;

A shell 121 with inlet nozzle 131 and two outlet nozzles 125; and

A U-tube bundle comprising U-tubes 124, tube sheet 135 and thirteen flow baffles 132.

The length of the shell 121 has been slightly increased compared to normal heat exchanger designs to provide room for a two-phase splitter of the present invention on the shell side downstream from the last flow baffle and downstream from the 180° bends of the U-tubes 124. The splitter comprises two essentially vertical suction channels 126 with holes 127 in their walls. The bottom ends of the suction channels 127 are open and available for liquid flow.

During operation, the tube side fluid enters the exchanger through the tube side inlet nozzle 129 and is routed through and inside the U-tubes and exits the exchanger through the tube side outlet nozzle 130. The shell side fluid enters the exchanger through the shell inlet nozzle 131 and may be a single phase or a two-phase stream. In addition to heat transfer, condensation or vaporization may take place in the exchanger. The shell side fluid flows on the outside of the U-tubes. The flow baffles 132 generate several cross flow sections where the shell side fluid is forced to flow through in a direction perpendicular to the tubes. After passage of the last flow baffle, the two-phase stream enters the separation space where the liquid 133 is separated from the vapor 134. The liquid phase 133 collects in the bottom of the shell 121. The vapor 134 now flows through the fraction of the holes 127 that are above the liquid surface. The vapor flow through these holes results in a pressure drop from outside the suction channel to inside the suction channel, and therefore liquid is lifted up into the suction channel. Liquid 133 flows through the open bottom end of the suction channels 126 and through the fraction of the holes 127 that are below the liquid surface. The liquid mixes with the vapor in the suction channel and flows through the suction channel and out of the exchanger 120 through the shell outlet nozzles 125.

In the examples given in FIGS. 4 and 5, a two-phase inlet stream is split to parallel downstream piping systems and process equipment. However, the present invention can also be used inside process equipment to distribute vapor and liquid evenly to parallel passes in the equipment. One example is the use of the present invention in the inlet header of heat exchangers or air coolers for equal distribution of vapor and liquid to the parallel tubes in the exchanger.

In all the examples of the invention given here, there is only one suction channel connected to each outlet pipe from the splitter. However, more than one suction channel may be used per outlet stream. If more than one suction channel is used per outlet stream, then the suction channels connected to an outlet stream do not necessarily need to be identical. For instance, a splitter designed for splitting a two-phase inlet stream into two outlet streams may have a total of five differently-sized suction channels, with three suction channels all connected to a first outlet stream and the remaining two suction channels connected to the second outlet stream. In some cases, the use of differently-sized suction channels for the same outlet stream may result in improved splitting performance.

In all the examples of applications of the invention given here, there is only one inlet stream to the splitter. However, more than one inlet stream to the separation vessel of the splitter may be used. Also single phase inlets transferring vapor only or liquid only may be used.

In addition to the ability to split a two-phase vapor-liquid mixture, the splitter of the present invention may also be used to split a two-phase mixture of immiscible liquids, such as a hydrocarbon liquid phase and an aqueous liquid phase, into two or more outlet streams, with the desired oil-to-water ratio of each outlet stream.

In general terms, the following may be noted regarding the invention:

The invention relates to a splitting device for splitting or dividing a two-phase inlet stream comprising a light and a heavy phase into two or more outlet streams with the desired light-to-heavy phase ratio of each outlet stream. The splitting device comprises a separation vessel or container with one or more inlets. In the vessel, partial or complete separation of the light and the heavy phases takes place. The vessel is provided with at least two hollow suction channels with a lower end and an upper open end.

Apertures in the side of each suction channel are provided at at least one elevation between the lower and the upper ends. The lower end of the suction channel is submerged in the heavy phase, while the upper open end of the suction channel is in the light phase and is connected in a leak-tight manner by flow channels to downstream systems.

The suction channels must have a vertical component so that during operation at least a fraction of the area of the apertures is elevated above the interphase level. During operation, the light phase flows through the fraction of the area of the apertures that is above the interphase level and thereby creates a pressure drop from outside to inside of the suction channel. Due to this pressure drop, the heavy phase is lifted up into the suction channel through any lower end opening and through any apertures that are located at levels below the interphase level. In the suction channel, the heavy phase is mixed with the light phase. The two-phase stream flows through the suction channel and through the flow channels to the downstream system.

Inserts or flow restrictions may be used inside the suction channels to increase the pressure drop and to modify the two-phase flow regime in the suction channels.

The inserts may be orifices with circular flow openings.

The bottom end of the suction channels may be closed, and all heavy phase needs to flow through the apertures in the side of the suction channels that are located below the inter-phase level.

The vessel or container may be an integral part of other process equipment used for other purposes, such as performing chemical reactions or exchange of heat, in addition to the purpose of stream splitting.

Said downstream systems may be parallel flow passes in the same piece of equipment which the splitter is an integral part of.

Said downstream systems may be process systems comprising piping, instrumentation, and equipment.

The suction channels may have circular cross sections.

The apertures in the side of the suction channels may be either circular holes or rectangular slots.

The vertical height from the bottom of a suction channel to the highest elevated aperture preferably is between 100 mm and 1500 mm.

The no-slip two-phase flow velocity in the upper end of the suction channels is preferably between 0.5 m/s and 15 m/s during at least one operating phase.

One or more suction channels may be connected to each downstream system.

The device may advantageously be used to split a two-phase vapor/liquid mixture to parallel heat exchangers.

The device may advantageously be used to split a two-phase vapor/liquid mixture to parallel furnace tubes.

The device may advantageously be used to split a two-phase vapor/liquid mixture to parallel chemical reactors.

The device may advantageously be used to split a two-phase vapor/liquid mixture to parallel air coolers.

The device may advantageously be used to distribute vapor and liquid to parallel heat exchange tubes or channels in a two-phase heat exchanger or air cooler.

What is claimed is:

1. A stream splitting device for splitting one or more two-phase inlet streams comprising a light phase fluid and a heavy phase fluid into two or more two-phase outlet streams with the desired ratio of light phase to heavy phase in each outlet stream, the device comprising:
   a phase separation vessel or container comprising:
      one or more inlet stream inlets for said inlet stream;
      a heavy phase collection region; and
      a light phase collection region at a higher level than said heavy phase collection region; and
   two or more suction channels or conduits, at least one for each of said outlet streams, each suction channel or conduit comprising:
      at least one heavy phase inlet communicating with said heavy phase collection region;
      at least one light phase inlet communicating with said light phase collection region and located at a higher level than said at least one heavy phase inlet; and
      at least one outlet stream outlet for communication with outlet stream flow conduits downstream of the device;
   said at least one light phase inlet being located between said at least one heavy phase inlet and said at least one outlet stream outlet;
   wherein said one or more inlet stream inlets each define a respective inlet stream entrance located above said heavy phase collection region.

2. A device according to claim 1, wherein each suction conduit comprises an elongate tubular element defined by a wall having one or more apertures provided therein.

3. A device according to claim 2, wherein said tubular element has an open lower end.

4. A device according to claim 2, wherein the shape of said one or more apertures is selected from a group of shapes consisting of at least one of circular, elliptical, oval, rectangular and triangular.

5. A device according to claim 1, wherein the light phase inlet and the heavy phase inlet each comprise a single aperture having an appreciable vertical dimension.

6. A device according to claim 5, wherein the width of said aperture increases in the direction toward said outlet stream outlet.

7. A device according to claim 5, wherein the width of said aperture is substantially constant.

8. A device according to claim 1, wherein flow restricting means are provided inside said suction conduits for increasing the pressure drop in said light phase across the at least one light phase inlet.

9. A device according to claim 8, wherein said flow restricting means comprise at least one transverse plate with one or more orifices therein such that the flow in the suction conduit is constrained to said one or more orifices.

10. A device according to claim 1, wherein flow impact means are provided adjacent said inlet stream inlet such that said inlet stream impacts said flow impact means.

11. A device according to claim 1, wherein the vertical distance between the lowest portion of said one or more heavy phase inlets and the highest portion of said one or more light phase inlets is at least approximately 100 mm and at most approximately 1500 mm.

12. A device according to claim 2, wherein the tubular element has a substantially circular cross-sectional shape.

13. A device according to claim 2, wherein the tubular element has a substantially rectangular cross-sectional shape.

14. A processing installation comprising an apparatus for carrying out a physical or chemical process utilizing a two phase stream and a stream splitting device according to claim 1, said device being interconnected with one of an inlet and an outlet of said apparatus.

15. An installation according to claim 14, wherein said apparatus comprises a furnace comprising a set of furnace tubes connected to said outlet stream outlets.

16. An installation according to claim 14, wherein said apparatus comprises parallel heat exchangers connected to said outlet stream outlets.

17. An installation according to claim 14, wherein said apparatus comprises parallel chemical reactors connected to said outlet stream outlets.

18. An installation according to claim 14, wherein said apparatus comprises parallel air coolers connected to said outlet stream outlets.

19. A two phase reactor, comprising a stream splitting device according to claim 1.

20. A reactor according to claim 19 and comprising an outer shell, wherein said phase separation vessel is located within said outer shell.

21. A heat exchanger comprising a stream splitting device according to claim 1.

22. A heat exchanger according to claim 21 and comprising an outer shell, wherein said phase separation vessel is located within said outer shell.

23. A device according to claim 1, further comprising a splash plate positioned downstream from said inlet stream entrance.

24. A device according to claim 1, wherein said inlet stream entrance is located at a lower end of said inlet stream inlet.

25. A device according to claim 24, further comprising an impingement plate positioned below each of said lower ends of said one or more inlet stream inlets.

26. A device according to claim 1, wherein said one or more inlet stream inlets comprise at least one inlet pipe.

27. A device according to claim 1, wherein each inlet stream comprises a two-phase vapor/liquid mixture.

28. A device according to claim 8, wherein said flow restricting means are located at an elevation below an uppermost extent of said at least one light phase inlet.

29. A method of splitting one or more two-phase inlet streams comprising a light phase fluid and a heavy phase fluid into two or more two-phase outlet streams with the desired ratio of light phase to heavy phase in each outlet stream, the method comprising the steps of:
  receiving said one or more two-phase inlet streams within a phase separation vessel or container;
  at least partly separating the inlet stream into a heavy phase portion located in a heavy phase region below an inter-phase boundary surface and a light phase portion located in a light phase region above said inter-phase boundary surface; and
  mixing heavy phase fluid from said heavy phase portion with light phase fluid from said light phase portion at two or more locations in said light phase region to form said two or more two-phase outlet streams;
  wherein said one or more two-phase inlet streams enter the phase separation vessel or container in the light phase region.

30. A stream splitting device for splitting one or more two-phase inlet streams comprising a light phase fluid and a heavy phase fluid into two or more two-phase outlet streams with the desired ratio of light phase to heavy phase in each outlet stream, the device comprising:
  a phase separation vessel or container comprising:
    one or more inlet stream inlets for said inlet stream;
    a heavy phase collection region; and
    a light phase collection region at a higher level than said heavy phase collection region; and
  two or more suction channels or conduits, at least one for each of said outlet streams, each suction channel or conduit comprising:
    at least one heavy phase inlet communicating with said heavy phase collection region;
    at least one light phase inlet communicating with said light phase collection region and located at a higher level than said at least one heavy phase inlet; and
    at least one outlet stream outlet for communication with outlet stream flow conduits downstream of the device;
  said at least one light phase inlet being located between said at least one heavy phase inlet and said at least one outlet stream outlet;
  wherein said one or more inlet stream inlets each define a respective inlet stream entrance located within said light phase collection region.

31. A device according to claim 30, further comprising a splash plate positioned downstream from said inlet stream entrance.

32. A device according to claim 30, wherein said inlet stream entrance is located at a lower end of said inlet stream inlet.

33. A device according to claim 32, further comprising an impingement plate positioned below each of said lower ends of said one or more inlet stream inlets.

34. A device according to claim 30, wherein said one or more inlet stream inlets comprise at least one inlet pipe.

35. A device according to claim 30, wherein each inlet stream comprises a two-phase vapor/liquid mixture.

36. A device according to claim 30, wherein each suction conduit comprises an elongate tubular element defined by a wall having one or more apertures provided therein.

37. A device according to claim 36, wherein said tubular element has an open lower end.

38. A device according to claim 36, wherein a cross-sectional shape of the tubular element is substantially circular or substantially rectangular.

39. A device according to claim 36, wherein the shape of said one or more apertures is selected from a group of shapes consisting of at least one of circular, elliptical, oval, rectangular and triangular.

40. A device according to claim 30, wherein the light phase inlet and the heavy phase inlet each comprise a single aperture having an appreciable vertical dimension.

41. A device according to claim 40, wherein the width of said aperture increases in the direction toward said outlet stream outlet.

42. A device according to claim 40, wherein the width of said aperture is substantially constant.

43. A device according to claim 30, wherein flow restricting means are provided inside said suction conduits for increasing the pressure drop in said light phase across the at least one light phase inlet.

44. A device according to claim 43, wherein said flow restricting means comprise at least one transverse plate with one or more orifices therein such that the flow in the suction conduit is constrained to said one or more orifices.

45. A device according to claim 43, wherein said flow restricting means are located at an elevation below an uppermost extent of said at least one light phase inlet.

46. A device according to claim 30, wherein flow impact means are provided adjacent said inlet stream inlet such that said inlet stream impacts said flow impact means.

47. A device according to claim 30, wherein the vertical distance between the lowest portion of said one or more heavy phase inlets and the highest portion of said one or more light phase inlets is at least approximately 100 mm and at most approximately 1500 mm.

48. A processing installation comprising an apparatus for carrying out a physical or chemical process utilizing a two phase stream and a stream splitting device according to claim 30, said device being interconnected with one of an inlet and an outlet of said apparatus.

49. An installation according to claim 48, wherein said apparatus comprises a furnace comprising a set of furnace tubes connected to said outlet stream outlets.

50. An installation according to claim 48, wherein said apparatus comprises parallel heat exchangers connected to said outlet stream outlets.

51. An installation according to claim 48, wherein said apparatus comprises parallel chemical reactors connected to said outlet stream outlets.

52. An installation according to claim 48, wherein said apparatus comprises parallel air coolers connected to said outlet stream outlets.

53. A two phase reactor, comprising a stream splitting device according to claim 30.

54. A reactor according to claim 53 and comprising an outer shell, wherein said phase separation vessel is located within said outer shell.

55. A heat exchanger comprising a stream splitting device according to claim 30.

56. A heat exchanger according to claim 55 and comprising an outer shell, wherein said phase separation vessel is located within said outer shell.

* * * * *